(12) United States Patent
Forthoffer (10) Patent No.: US 9,960,438 B2
(45) Date of Patent: May 1, 2018

(54) FUEL CELL SYSTEM AND METHOD TO PREVENT WATER-INDUCED DAMAGE

(71) Applicant: FORD GLOBAL TECHNOLOGIES, LLC, Dearborn, MI (US)

(72) Inventor: Daniel William Forthoffer, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 13/827,502

(22) Filed: Mar. 14, 2013

(65) Prior Publication Data

US 2014/0272646 A1    Sep. 18, 2014

(51) Int. Cl.
| | |
|---|---|
| *H01M 8/04* | (2016.01) |
| *H01M 8/04089* | (2016.01) |
| *H01M 8/04223* | (2016.01) |
| *H01M 8/04082* | (2016.01) |
| *H01M 8/0438* | (2016.01) |
| *H01M 8/1018* | (2016.01) |

(52) U.S. Cl.
CPC ... *H01M 8/04104* (2013.01); *H01M 8/04201* (2013.01); *H01M 8/04231* (2013.01); *H01M 8/04253* (2013.01); *H01M 8/04388* (2013.01); *H01M 8/04395* (2013.01); *H01M 2008/1095* (2013.01)

(58) Field of Classification Search
CPC ......... H01M 8/04104; H01M 8/04253; H01M 8/04231; H01M 8/04432
See application file for complete search history.

(56) References Cited

U.S. PATENT DOCUMENTS

| | | | |
|---|---|---|---|
| 6,593,018 B2 | 7/2003 | Ruoff et al. | |
| 6,653,004 B1 | 11/2003 | Barber | |
| 6,709,780 B2 | 3/2004 | Keskula et al. | |
| 6,821,664 B2 | 11/2004 | Parks et al. | |
| 6,884,534 B2 | 4/2005 | Wheat et al. | |
| 7,011,903 B2 | 3/2006 | Benson et al. | |
| 7,087,333 B2 | 8/2006 | Schafer | |
| 7,479,336 B2 | 1/2009 | Willimowski et al. | |
| 7,547,482 B2 | 6/2009 | Gallagher | |
| 8,244,382 B2 | 8/2012 | Wang et al. | |
| 2001/0055707 A1* | 12/2001 | Roberts et al. | 429/30 |
| 2003/0134164 A1* | 7/2003 | Reiser | H01M 8/04223 429/415 |
| 2003/0138681 A1 | 7/2003 | Boneberg et al. | |
| 2003/0211374 A1 | 11/2003 | Dehne | |

(Continued)

FOREIGN PATENT DOCUMENTS

| | | |
|---|---|---|
| EP | 1 836 742 B1 | 5/2009 |
| WO | 03094277 A1 | 11/2003 |

(Continued)

*Primary Examiner* — Jonathan G Jelsma
(74) *Attorney, Agent, or Firm* — James Dottavio; Brooks Kushman P.C.

(57) ABSTRACT

In one or more embodiments, a fuel cell system includes a fuel cell stack including an anode and a cathode, a first conduit positioned to supply oxygen to the cathode, a second conduit positioned to supply hydrogen to the anode, and a third conduit positioned separate from the first and second conduits and to supply oxygen to the second conduit. The third conduit may be positioned to supply oxygen from the first conduit to the second conduit.

20 Claims, 4 Drawing Sheets

(56) References Cited

U.S. PATENT DOCUMENTS

| | | |
|---|---|---|
| 2005/0175875 A1 | 8/2005 | Nelson et al. |
| 2006/0040150 A1* | 2/2006 | Yu .................... H01M 8/04231 |
| | | 429/429 |
| 2006/0046106 A1* | 3/2006 | Yu .................... H01M 8/04231 |
| | | 429/414 |
| 2006/0099469 A1 | 5/2006 | Meltser et al. |
| 2006/0141310 A1* | 6/2006 | Miyata et al. .................. 429/24 |
| 2007/0026276 A1* | 2/2007 | Ogawa et al. .................. 429/22 |
| 2007/0031711 A1* | 2/2007 | Miyata et al. .................. 429/25 |
| 2007/0292728 A1* | 12/2007 | Shibata ............. H01M 8/04231 |
| | | 429/429 |
| 2008/0038602 A1* | 2/2008 | Yu .................... H01M 8/04097 |
| | | 429/415 |
| 2008/0145717 A1* | 6/2008 | Yu .................................. 429/13 |
| 2008/0187791 A1* | 8/2008 | Matsumoto ....... H01M 8/04179 |
| | | 429/444 |
| 2008/0245588 A1* | 10/2008 | Wake et al. ................. 180/65.3 |
| 2009/0035614 A1* | 2/2009 | Wake et al. ..................... 429/13 |
| 2009/0220830 A1 | 9/2009 | Limbeck et al. |
| 2010/0055523 A1* | 3/2010 | Ogawa et al. .................. 429/25 |
| 2010/0062295 A1 | 3/2010 | Heo et al. |
| 2012/0115056 A1 | 5/2012 | Meier |
| 2012/0115060 A1 | 5/2012 | Stier et al. |
| 2012/0276460 A1* | 11/2012 | Kumei .............. H01M 8/04104 |
| | | 429/410 |

FOREIGN PATENT DOCUMENTS

| | | |
|---|---|---|
| WO | 2005078847 A1 | 8/2005 |
| WO | 2006069090 A2 | 6/2006 |

\* cited by examiner

FUEL CELL SYSTEM AND METHOD TO PREVENT WATER-INDUCED DAMAGE

TECHNICAL FIELD

Various embodiments relate to a fuel cell system and method for managing the creation and accumulation of water to prevent water-induced damage.

BACKGROUND

Cost and durability can be barriers to the wide-spread use of hydrogen fuel cell vehicles. Fuel cell stack durability may in turn depend greatly on the ability of the fuel cell to respond to stressors such as startup/shutdown operation and idle operation. Among other things, operating conditions during prolonged idle periods and shutdown may damage the fuel cell.

SUMMARY

In one or more embodiments, a fuel cell system includes a fuel cell stack including an anode (106) and a cathode (104), a first conduit (108) positioned to supply oxygen to the cathode (104), a second conduit (110) positioned to supply hydrogen to the anode (106), and a third conduit (112) positioned separate from the first and second conduits and to supply oxygen to the second conduit (110). The third conduit may be positioned to supply oxygen from the first conduit (108) to the second conduit (110).

The fuel cell system may further include a proportional valve connected to the second conduit to control a hydrogen flow into the anode through the second conduit. The proportional valve may be positioned upstream or downstream of the third conduit.

The fuel cell system may further include a proportional valve connected to the third conduit to control an oxygen flow into the second conduit through the third conduit.

The fuel cell system may further include a three-way valve connected to the first and third conduits to allow at least a portion of an oxygen flow from the oxygen source.

The fuel cell system may further include a three-way valve connected to the second and third conduits to allow at least a portion of an oxygen flow from the third conduit.

The third conduit may be independent of the first conduit. In certain instances, the third conduit may be connected to a second oxygen source independent of the oxygen source connected to the first conduit.

The fuel cell system may further include an oxygen flow controller connected to the oxygen source.

The fuel cell system may further include a pressure monitor (118) detecting a pressure differential between the anode and cathode. The pressure monitor may include an anode pressure reader and a cathode pressure reader. The pressure monitor may communicate with the third conduit.

In an alternate embodiment, a method of managing water-induced damage to a fuel cell system may further involve the steps of providing a fuel cell system including an anode and a cathode, a first conduit positioned to supply oxygen to the cathode, a second conduit positioned to supply hydrogen to the anode, and a third conduit positioned in fluid communication with the first and second conduits; measuring fuel cell operating parameters; determining the value of at least one predetermined fuel cell operating variable from the measured operating parameters; controlling hydrogen flow into the anode through the second conduit as a function of the determined value of at least one fuel cell operating variable; and controlling oxygen flow into the second conduit via the third conduit as a function of the determined value of at least one fuel cell operating variable to control water creation at predetermined stages of a fuel cell cycle to minimize water accumulation and any associated water-induced damage.

DETAILED DESCRIPTION

Reference will now be made in detail to embodiments and methods of the present invention which constitute the best modes of practicing the invention presently known to the inventors. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary, percent (%), "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains. Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The term "anode" refers to the specific region where the gases flow within the fuel cell on the positively charged side of the membrane. By way of example, it is the positively charged region where hydrogen gas enters and is stripped of its electrons.

The term "cathode" refers to the specific region where the gases flow within the fuel cell on the negatively charged side of the membrane. By way of example, it is the negatively charged region where oxygen enters to react with the ionized hydrogen to create electrical energy and water.

The term "polymer electrolyte membrane fuel cell" or "proton exchange membrane fuel cell" is used interchangeably with the abbreviation "PEMFC" and refers to a fuel cell with a polymer electrolyte membrane that transforms the chemical energy liberated during the electrochemical reaction of hydrogen and oxygen to electrical energy.

The term "membrane electrode assembly" is used interchangeably with the abbreviation "MEA."

Fuel Cell Assembly Design

With the increasing interest in efficient and clean energy technologies, fuel cells and in particular proton exchange membrane fuel cells (PEMFC) have attracted much attention for applications in transportation, stationary, portable and micro-power systems.

Per the general functionality of a PEMFC, a stream of hydrogen is delivered to the anode side of the membrane electrode assembly (MEA). At the anode side it is catalytically split into protons and electrons. This oxidation half-cell reaction is represented as follows:

At the Anode:

$$H_2 \rightarrow 2H^+ + 2e^- \quad E^\circ = 0V \qquad (1)$$

The newly formed protons permeate through the polymer electrolyte membrane to the cathode side. The electrons travel along an external load circuit to the cathode side of the MEA, thus creating the current output of the fuel cell. Meanwhile, a stream of oxygen is delivered to the cathode side of the MEA. At the cathode side oxygen molecules react with the protons permeating through the polymer electrolyte membrane and the electrons arriving through the external circuit to form water molecules. This reduction half-cell reaction is represented as follows:

At the cathode:

$$\tfrac{1}{2}O_2 + 2H^+ + 2e^- \rightarrow H_2O \quad E^\circ = 1.229V \qquad (2)$$

Overall reaction:

$$H_2 + \tfrac{1}{2}O_2 \rightarrow H_2O \quad E^\circ = 1.229V \qquad (3)$$

The reversible reaction is expressed in the above equation and shows the reincorporation of the hydrogen protons and electrons together with the oxygen molecule and the formation of one water molecule.

Fuel cell assemblies and power plants are well known. One example fuel cell assembly includes multiple individual cells arranged in a stack. Each individual cell has an anode and a cathode positioned on either side of proton exchange membrane. A fuel, such as hydrogen, is supplied to an electrode on the anode side of the proton exchange membrane. An oxidant, such as air, is supplied to another electrode on the cathode side of the proton exchange membrane. The fuel is fluid and moves through channels in a plate to the anode side of the proton exchange membrane. The oxidant is fluid and moves to the cathode side of the proton exchange membrane through channels in another plate.

As known, electrochemical reactions within the fuel cell produce water. Although some water is typically required to facilitate the chemical reactions, excessive water accumulation can flood or otherwise damage the fuel cell. This is especially a concern during cold weather days when accumulated water can freeze under idle conditions and in particular after shut down, blocking and/or damaging the path of the oxidant to the catalyst surface—degrading the fuel cell stack. As such, managing water accumulation during key stages of fuel cell operation can enhance fuel cell performance and durability.

To prevent water-induced damage to the fuel cell, embodiments of this invention disclose a system and control strategy to progressively limit and/or reduce the amount of reactant gas during the shutdown process to reduce and/or eliminate the presence of water at this stage to reduce the likelihood of frozen fuel cell complications. As part of this strategy, certain embodiments disclose the use of a proportional three-way valve that can introduce cathode gases into the anode intake gas stream to equalize pressures on either side of the proton or ionic exchange membrane (PEM) to prevent PEM damage during the shutdown process. Likewise, embodiments of the control strategy demand current from the stack during the shutdown process to ensure all anode gases are consumed during the shutdown process.

Figure 1A:
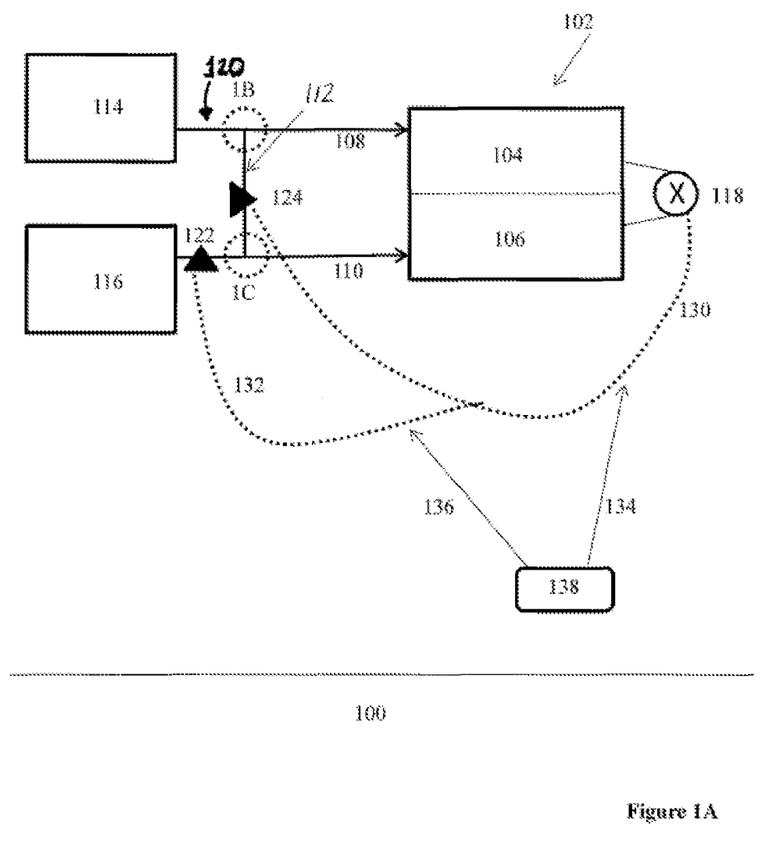
FIG. 1A illustratively depicts a fuel cell system according to one or more embodiments of the present invention.

In one or more embodiments, and as depicted in FIG. 1A, a fuel cell system 100 is provided to mitigate some of the above-identified problems associated with fuel cell shutdown, and in particular unwanted water accumulation. The fuel cell system 100 includes a fuel cell stack 102 including an anode 106 and a cathode 104, a first conduit 108 positioned to supply oxygen to the cathode 104, a second conduit 110 positioned to supply hydrogen to the anode 106, and a third conduit 112 positioned separate from the first and second conduits and to supply oxygen to the second conduit 110. Without wanting to be limited to any particular theory, it is believed that after a shutdown is initiated, hydrogen flow into the anode is reduced such that less and less amount of hydrogen is available for water formation at the fuel cell stack; as result, water accumulation within the fuel cell stack if any can be maintained at a safe manageable level in preparation for cold weather storage. The benefit of this fuel cell system is extended further that potentially undesirable pressure differential developed due to the reduction of hydrogen flow can be effectively mitigated by the employment of the third conduit, as necessary, to supply oxygen into the second conduit such that the pressure differential may be kept at a predetermined healthy level.

Although the fuel cell stack 102 is depicted in FIG. 1A as showing one anode 106 and one cathode 104, in operation, the fuel cell stack 102 may be formed of a number of anode-cathode units serially connected together. Therefore, the anode 106 and the cathode 104 should be viewed as collectively representing all the anodes and the cathodes, respectively, in the fuel cell stack 102.

Figure 3:
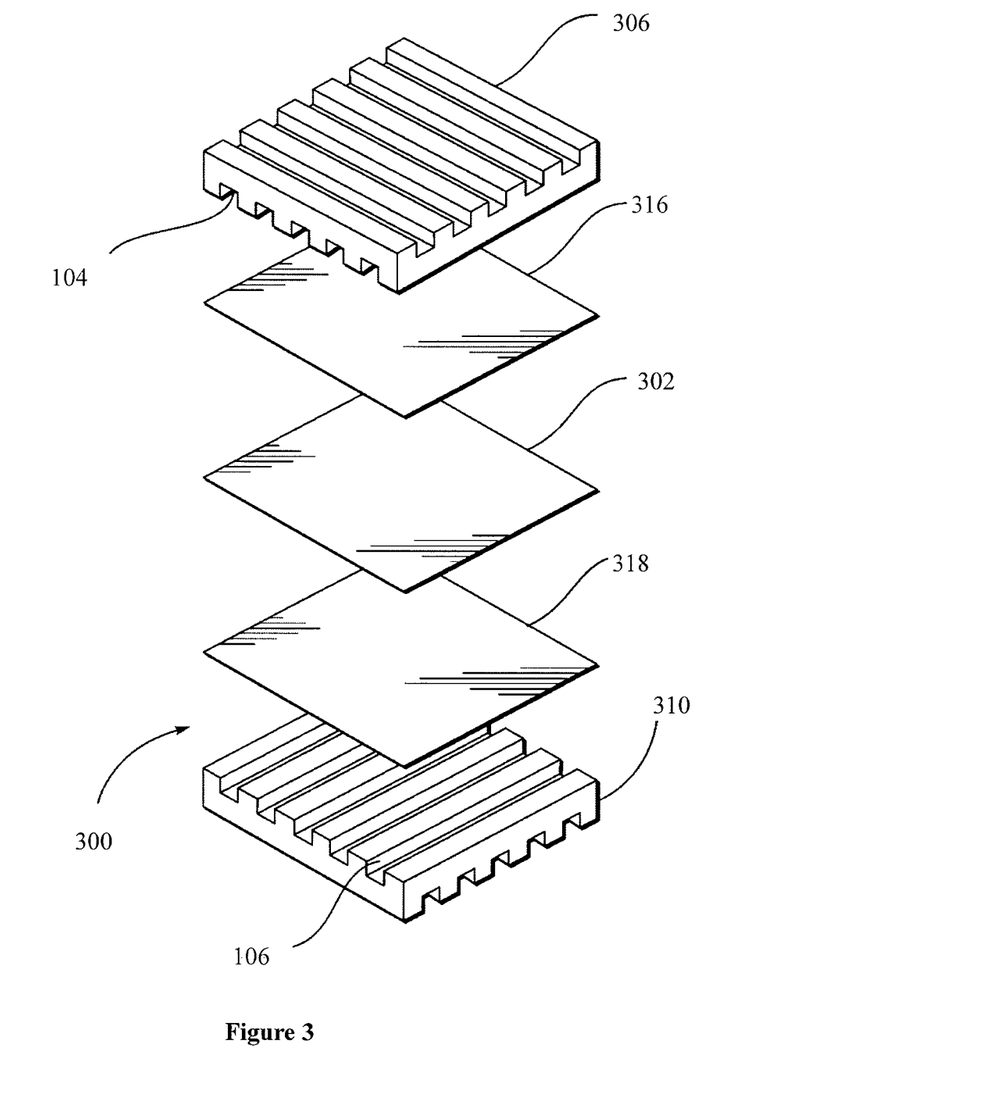
FIG. 3 illustratively depicts an enlarged view of a fuel cell stack referenced in the fuel cell system of FIG. 1A.

For purposes of illustration, an exemplary fuel cell 300 is schematically depicted in FIG. 3. The fuel cell 300 includes a pair of bi-polar plates 306, 310 having grooves 104, 106 formed at a predetermined interval on both sides of each of the bi-polar plates 306, 310. The fuel cell 300 also includes an ionic exchange membrane 302 disposed between the bi-polar plates 306, 310, a cathode or an air electrode 316 disposed between the ionic exchange membrane 302 and the bi-polar plate 306, and an anode or a fuel electrode 318 disposed between the ionic exchange membrane 302 and the bi-polar plate 310.

The bi-polar plates 306 and 310 are for preventing fuel and air (an oxidizer) from being mixed. The grooves 316 and 318 are used as fuel (anode) and air (cathode) passages in the cells connected end to end.

In operation, air or oxygen is introduced into the cathode 104, and hydrogen gas is introduced into the anode 106 as fuel, which results in separation of the hydrogen gas into hydrogen ions and electrons on the anode electrode 318. These hydrogen ions move to the cathode 104 side in the ionic exchange membrane 302, while the electrons move via an external circuit (not shown) to the cathode electrode 316 side. In the cathode 104, oxygen, electrons, and hydrogen ions react to generate water.

The first conduit 108 transports oxygen from an oxygen source 114 to the cathode 104. The oxygen source 114 may be used to store compressed oxygen or compressed air which is then a lesser condensed form of oxygen. A compressor (not shown) may be positioned within or near the oxygen source 114 and/or the first conduit 108 to control oxygen flow out from the oxygen source 114. In certain instances, the compressor may be positioned at or near spot 120 where the oxygen source 114 is connected with the first conduit 108.

The second conduit 110 transports hydrogen from a hydrogen source 116 to the anode 106. The hydrogen source 116 may be used to store compressed hydrogen or an indirect source of hydrogen which can then be physically or chemically digested to release or form hydrogen. A proportional valve 122 may be positioned at or near the hydrogen source 116 or the second conduit 110 to control hydrogen flow out from the hydrogen source 116. In certain instances, the proportional valve 122 may be positioned within or near the second conduit 110. Although one proportional valve 122 is depicted in FIG. 1A, two or more proportional valves may be used if necessary to control and adjust the hydrogen flow. The proportional valve 122 may be positioned upstream of the third conduit 122 as depicted in FIG. 1A.

Figure 1B:
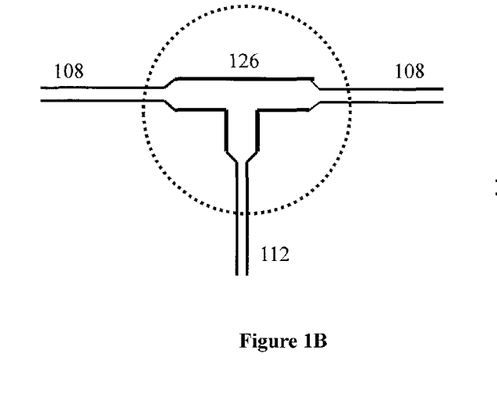
FIG. 1B illustratively depicts an enlarged view of a connection referenced in the fuel cell system of FIG. 1A.
Figure 1C:
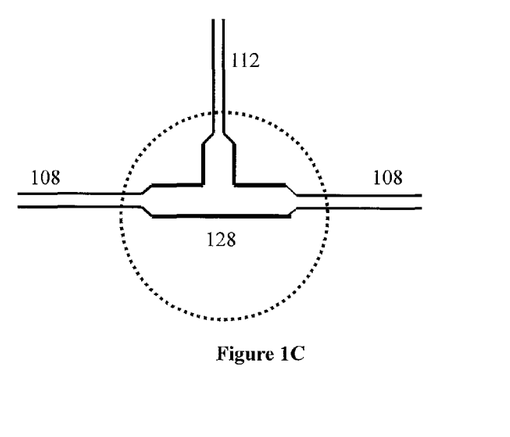
FIG. 1C illustratively depicts an enlarged view of another connection referenced in the fuel cell system of FIG. 1A.

A flow control device 124 may be positioned at or near the third conduit 112 to control oxygen flow into the second conduit 110 through the third conduit 112. In certain instances, the flow control device 124 may be used to bypass a portion of the oxygen flow from the first conduit 108 to the second conduit 110 through the third conduit 112. When positioned within or near the third conduit 112, the flow control device 124 may be another proportional valve to control the oxygen flow bypassed from the first conduit 108. To effect this configuration, a three-way valve 126 may be positioned at location 1B where the first conduit 108 meets the third conduit 112. FIG. 1B depicts an enlarged view of location 1B showing the positioning of the three-way valve 126. In addition, another three-way valve 128 may be positioned at location 1C where the second conduit 108 meets the third conduit 112. FIG. 1C depicts an enlarged view of location 1C showing the position of the three-way valve 128.

The proportional valve 122 and 124 can remain at a position other than fully-on/fully-off for an indefinite period of time, which is beneficial in this implementation to allow proper control of the fuel cell stack 102 while it ramps-down its power output during a shutdown.

Alternatively the third conduit 112 may be supplying oxygen to the second conduit 110 from a source other than the oxygen source 114; therefore, in this configuration, the third conduit 112 does not have to be connected to the first conduit 108. In certain instances, the third conduit 112 may be supplying oxygen from the atmospheric air to the second conduit 110.

A pressure differential between the anode 106 and the cathode 104 may be detected via a pressure monitor 118. The pressure monitor 118 may be a differential pressure sensor which negates ambient and reads the pressure difference between the cathode 104 and the anode 106. Alternatively, the pressure monitor 118 may be in the form of a set of pressure readers, one positioned to read the pressure at the cathode 104 and the other positioned to read the pressure at the anode 106, with the difference between the two pressure readers being reported as the pressure differential.

The pressure monitor 118 may communicate with the proportional valve 122 via a feedback control loop 132.

The pressure monitor 118 may communicate with the proportional valve 124 via a feedback control loop 130.

A controller 138 may be in signal communication with the feedback control loops 130, 132 with control loops 134, 136, respectively. The controller 138 obtains input from the pressure monitor 118 and/or other operation parameters, sends one or more control signals to adjust the operation of the proportional valve 122, 124. Non-limiting examples of the operation parameters may include the stack current, stack voltage, individual cell voltage, exhaust humidity, stack water content and compressor speed.

The oxygen flow supplied to the second conduit 110 through the third conduit 112 may be particularly beneficial to maintain an adequate pressure differential between the anode 106 and the cathode 104 such that potential damages to the membrane 302 there between may be effectively mitigated.

Figure 2:
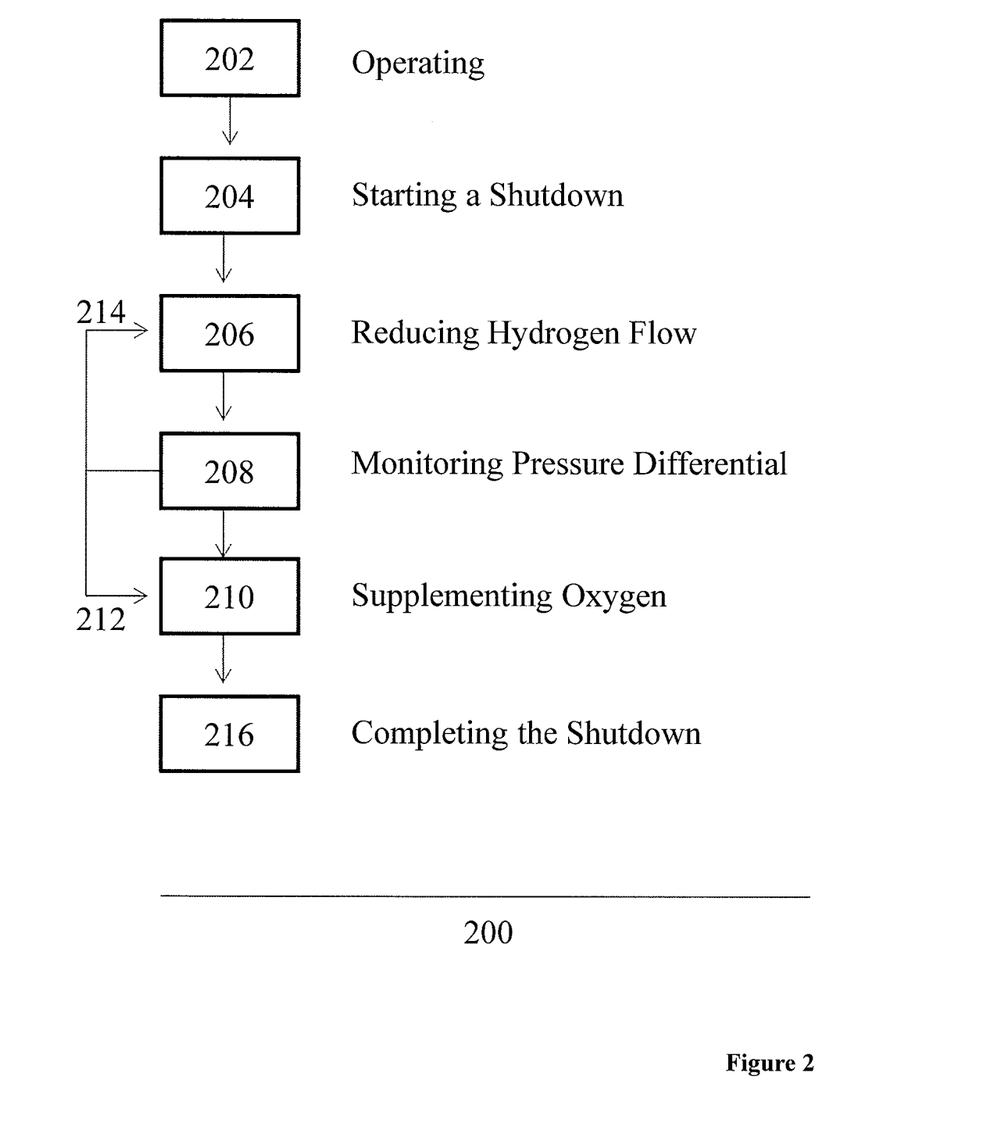
FIG. 2 illustratively depicts a sample process flow to reduce water accumulation during shutdown using the fuel cell system of FIG. 1A.

Referring to FIG. 2, a method for operating a fuel cell system 100 is generally shown at 200. At step 202, oxygen or air is flowing into the cathode 104 via the first conduit 108, and hydrogen is flowing into the anode 106 via the second conduit 110. The proportional valve 124 is closed and the three-way valves 126, 128 are each in a position to allow for full flow through the first and second conduits 108, 110, respectively. There should be no material flow through the third conduit 112 at this time point.

At step 204, a shutdown of the fuel cell stack 102 is requested.

At step 206, the oxygen flow out from the oxygen source 114 is maintained while the hydrogen flow out from the hydrogen source 116 is decreased via the proportional valve 122. Without wanting to be limited to any particular theory, this step is implemented to remove as much water as possible from the fuel cell stack 102. Via the use of the proportional valve 122, the hydrogen flow out from the hydrogen source 116 may be finely adjusted to any desirable flow rate for any desirable period of time. By way of example, the reduction in the hydrogen flow may be relatively small at the beginning of the shutdown and may increase in value as the shutdown progresses. Possibly, the hydrogen flow may be reduced in a steady rate.

With the continuing reduction of the hydrogen flow at the anode 106, the pressure differential between the anode 106 and the cathode 104 may increase. As detailed herein elsewhere, at step 208, the pressure differential may be monitored at least periodically, and sometimes continuously, by the pressure monitor 118.

At steps 210, 212 and 214, if the pressure differential reaches a predetermined level, the control 138 may send a signal or command via the feedback loops 130 and 134 to adjust the proportional valve 124. By way of example, if the pressure differential between the cathode 104 and the anode 106 becomes two large such that the membrane 302 positioned there between may crack or otherwise be damaged, the proportional valve 124 may work in concert with the three-way valves 126 and 128 to allow for the needed amount of oxygen into the second conduit 110 bypassed from the first conduit 108, which eventually will make its way to the anode 106. As result, the pressure differential may be reduced accordingly.

Alternatively, the amount of oxygen needed to reduce the pressure differential may come from a source other than the oxygen source 114. By way of example, the third conduit 112 may be connected to an independent compressed air or oxygen tank. One benefit of this configuration is that the entire system complexity may be reduced by the elimination of the three-way valve 126.

At step 216, the shutdown is complete when the fuel cell stack 102 is no longer producing water and contains a sufficiently small enough volume of water such that during any extended idle period—any period within which the fuel cell stack is subjected to temperatures that could cause the water inside the fuel cell stack to freeze (for example, overnight freezing)—will not pose potential danger to the fuel cell stack 102.

In an alternate embodiment, a method of managing water-induced damage to a fuel cell system is disclosed. Under this embodiment, relevant fuel cell operating parameters are measured, such as for example, the pressure at the cathode 104 and the anode 106 and under this example, the value of at least one fuel cell operating variable, i.e. the pressure differential between the cathode 104 and the anode 102 is determined. The method then controls the flow of hydrogen into the anode 106 and/or the flow of oxygen into the second conduit as a function of the measured operating parameters to control water creation at predetermined stages of the fuel cell cycle to minimize or eliminate water accumulation.

While the best mode for carrying out the invention has been described in detail, those familiar with the art to which this invention relates will recognize various alternative designs and embodiments for practicing the invention as defined by the following claims.

What is claimed:

1. A fuel cell system comprising:
    a controller programmed to direct an oxygen-containing airflow to a cathode through a first conduit and a hydrogen flow to an anode through a second conduit and, responsive to a shutdown request, concurrently:
    provide a reduced hydrogen flow to the anode;
    maintain a first portion of the oxygen-containing airflow to the cathode; and
    redirect a second portion of the oxygen-containing airflow through a third conduit to the second conduit.

2. The fuel cell system of claim 1, further comprising a proportional valve connected to the second conduit to control hydrogen flow into the anode through the second conduit.

3. The fuel cell system of claim 1, wherein the oxygen-containing airflow is an unaltered oxygen-containing airflow.

4. The fuel cell system of claim 1, further comprising a proportional valve connected to the third conduit to control the oxygen-containing airflow into the second conduit.

5. The fuel cell system of claim 4, further comprising a three-way valve connected to the first and third conduits to allow the oxygen-containing airflow into the second conduit.

6. The fuel cell system of claim 4, further comprising a three-way valve connected to the second and third conduits to allow at least a portion of the oxygen-containing airflow from the third conduit.

7. The fuel cell system of claim 1, further comprising an oxygen-containing airflow controller connected to an oxygen source.

8. The fuel cell system of claim 1, further comprising a pressure monitor detecting a pressure differential between the anode and cathode.

9. The fuel cell system of claim 8, wherein the pressure monitor includes an anode pressure reader and a cathode pressure reader.

10. The fuel cell system of claim 9, wherein the pressure monitor communicates with the third conduit.

11. The fuel cell system of claim 1, wherein the controller is further programmed to maintain a hydrogen flow rate in the second conduit during shutdown of the fuel cell stack.

12. The fuel cell system of claim 11, wherein maintaining comprises reducing the hydrogen flow at a steady rate.

13. A fuel cell system comprising:
    a controller programmed to, responsive to a fuel cell stack shutdown request, redirect a first portion of an oxygen-containing airflow from a first conduit supplying the oxygen-containing airflow to a cathode during the fuel cell stack operating conditions to a second conduit arranged to supply hydrogen flow to an anode through a third conduit, positioned separate from and connecting the first and second conduits, and concurrently maintain a second portion of the oxygen-containing airflow to the cathode, and concurrently provide a reduced hydrogen flow to the anode;
    a first proportional valve, connected to a second conduit, configured to control the hydrogen flow into the anode through the second conduit;
    a second proportional valve, connected to the third conduit, configured to control the oxygen-containing airflow into the second conduit through the third conduit; and
    a pressure monitor configured to measure pressure differential between the anode and cathode and to communicate with the first and second proportional valves;
    wherein the controller is further programmed to adjust the first and second proportional valves based on inputs from the pressure monitor.

14. The fuel cell system of claim 13, further comprising a three-way valve connected to the first and third conduits to control the oxygen-containing airflow from an oxygen source.

15. The fuel cell system of claim 13, further comprising a three-way valve connected to the second and third conduits to allow at least a portion of the oxygen-containing airflow from the third conduit.

16. A method of managing water-induced damage to a fuel cell system, the method comprising:
- providing a fuel cell system including an anode and a cathode, a first conduit positioned to supply oxygen to the cathode, a second conduit positioned to supply hydrogen to the anode, and a third conduit positioned in fluid communication with the first and second conduits;
- measuring at least one fuel cell operating parameter;
- determining the value of at least one predetermined fuel cell operating variable from the measured operating parameters;
- controlling hydrogen flow into the anode through the second conduit as a function of the determined value of at least one fuel cell operating variable;
- controlling oxygen flow into the second conduit via the third conduit as a function of the determined value of at least one fuel cell operating variable to control water creation at predetermined stages of a fuel cell cycle to minimize water accumulation and any associated water-induced damage; and
- responsive to a shutdown request, concurrently:
  - provide a reduced hydrogen flow to the anode;
  - maintain a first portion of the oxygen flow to the cathode; and
  - redirect a second portion of the oxygen flow through the third conduit to the second conduit.

17. The method of claim 16, wherein the controlling step includes supplying a portion of the oxygen flow through the third conduit using a flow control device positioned in fluid communication with the third conduit.

18. The method of claim 16, wherein the step of measuring fuel cell operating parameters measures the pressure at the anode and the cathode and the determining step obtains the value of any pressure differential between the anode and the cathode.

19. The method of claim 18, wherein the step of providing a fuel cell system, further includes an oxygen flow controller in communication with the second and third conduits to facilitate adjustment of the oxygen flow as a function of the value of a pressure differential.

20. The method of claim 16, further comprising the step of demanding current from the anode and the cathode during a shutdown cycle as a function of the determined value of at least one fuel cell operating variable.

* * * * *